(12) United States Patent
Higashitani et al.

(10) Patent No.: US 12,519,263 B2
(45) Date of Patent: Jan. 6, 2026

(54) DEVICE CONNECTOR

(71) Applicant: Yazaki Corporation, Tokyo (JP)

(72) Inventors: Masanobu Higashitani, Makinohara (JP); Shingo Nishihara, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 293 days.

(21) Appl. No.: 18/451,489

(22) Filed: Aug. 17, 2023

(65) Prior Publication Data

US 2024/0088600 A1    Mar. 14, 2024

(30) Foreign Application Priority Data

Sep. 14, 2022 (JP) .................................. 2022-146280

(51) Int. Cl.
*H01R 13/512*    (2006.01)
*H01R 13/533*    (2006.01)

(52) U.S. Cl.
CPC ......... *H01R 13/512* (2013.01); *H01R 13/533* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 11,181,078 B2* | 11/2021 | Kurigami | F02M 37/0041 |
| 2004/0056428 A1* | 3/2004 | Yoshida | F16J 15/3264 |
| | | | 277/572 |
| 2017/0155207 A1* | 6/2017 | Williams | H01R 43/18 |
| 2020/0388960 A1* | 12/2020 | Yagi | B60L 50/64 |
| 2021/0159679 A1* | 5/2021 | Kidane | H02G 3/0406 |

FOREIGN PATENT DOCUMENTS

| | | | | |
|---|---|---|---|---|
| CN | 114447675 A | * | 5/2022 | ............ H02J 7/0042 |
| CN | 114824885 A | * | 7/2022 | ............ H01R 43/18 |
| DE | 102007000194 A1 | * | 10/2007 | ......... F02M 63/0026 |
| JP | 2015-082466 A | | 4/2015 | |

* cited by examiner

*Primary Examiner* — Tho D Ta
(74) *Attorney, Agent, or Firm* — Sughrue Mion, PLLC

(57) ABSTRACT

A device connector 1 includes a pair of terminal portions 2, 2 facing a mating device and a housing body 3 made of synthetic resin containing the pair of terminal portions, wherein each of the terminal portions includes a device-side terminal 21 configured to engage with the mating device, an electric wire-side terminal 22 connected to an electric wire, and a connection conductor 23 having a flexibility and configured to connect the device-side terminal and the electric wire-side terminal, wherein the connection conductor is formed to have an extra length portion 23C and extend toward the device-side terminal, the housing body includes a housing unit 4 containing the pair of terminal portions, and an insulation wall 5 located in the housing unit to insulate the connection conductors from each other, and the insulation wall configured to include a material with a lower Mohs hardness than the housing unit.

9 Claims, 6 Drawing Sheets

DEVICE CONNECTOR

TECHNICAL FIELD

The present invention relates to a device connector.

BACKGROUND

Conventionally, a connector for a device attached to a device housing of an electronic device mounted on a vehicle, such as, e.g., an inverter or a motor mounted on a hybrid vehicle or an electric vehicle, is known (for example, see Patent Document 1).

The connector for the device disclosed in Patent Document 1 includes a pair of terminal portions and a housing for holding the pair of terminal portions.

Each of the terminal portions includes an electric wire-side terminal connected to an end of an electric wire, a device-side terminal connected to a device, and a connection conductor in a tubular shape for electrically connecting the electric wire-side terminal and the device-side terminal. The device-side terminal is formed to extend to a front side toward a case of the device, and the electric wire-side terminal is formed to be connected to the electric wire and extend to a lower side. The connection conductor is connected to a rear end of the device-side terminal and formed to be extend to a rear side. The connection conductor is composed of round braided wires that have a bulging portion at the central portion in the axial direction, and has a characteristic of easily stretchable in the axial direction.

With the conventional connector for the device, in a case where, for example, the housing thermally expands (contracts) due to high temperature environment or heat generated by the electric wire caused by current flow, and accordingly, each terminal portion is pushed and pulled in the axial direction (in the engaging direction with respect to the mating terminal), the connection conductor absorbs change in the distance by expanding and contracting in the axial direction, so that the application of pushing and pulling force in the axial direction to the device-side terminal is avoided, and the mating state with the mating terminal is maintained.

RELATED ART

Patent Document

[Patent Document 1] JP 2015-082466 A

SUMMARY OF THE INVENTION

Problem to be Solved by the Invention

The conventional connector for the device may be provided with a partition wall that separates the interior of the housing for the purpose of insulating a pair of terminal portions from each other. The housing including this partition wall is generally composed of glass fiber-filled synthetic resin that includes glass fiber.

However, the glass fiber-filled synthetic resin has a relatively high hardness, and therefore, for example, in a case where the connection conductor and the partition wall (insulation wall) come into contact with each other due to vibration of the vehicle and the like, the connection conductor may wear out and generate wear particles. In a case where the connection conductor and the partition wall are separated to such an extent that they do not come into contact with each other, the conventional connector for the device increases in size in the separation direction.

It is an object of the present invention to provide a device connector that alleviates generation of wear particles due to sliding of a connection conductor on an insulating wall.

Solution to Problem

In order to solve the problem and achieve the object, a device connector according to the present invention is a device connector for engaging with a mating device, including: a pair of terminal portions facing the mating device; and a housing body made of synthetic resin containing the pair of terminal portions, wherein each of the terminal portions includes: a device-side terminal configured to engage with the mating device; an electric wire-side terminal connected to an electric wire; and a connection conductor having a flexibility and configured to connect the device-side terminal and the electric wire-side terminal, wherein the connection conductor is formed to have an extra length portion and extend toward the device-side terminal, the housing body includes: a housing unit containing the pair of terminal portions; and an insulation wall located in the housing unit to insulate the connection conductor of one of the terminal portions from the connection conductor of the other of the terminal portions, and the insulation wall is configured to include a material with a lower Mohs hardness than the housing unit.

Advantageous Effects of the Invention

According to the present invention, generation of wear particles due to sliding of a connection conductor on an insulating wall can be alleviated.

DETAILED DESCRIPTION OF THE EXEMPLARY EMBODIMENT

Figure 1:
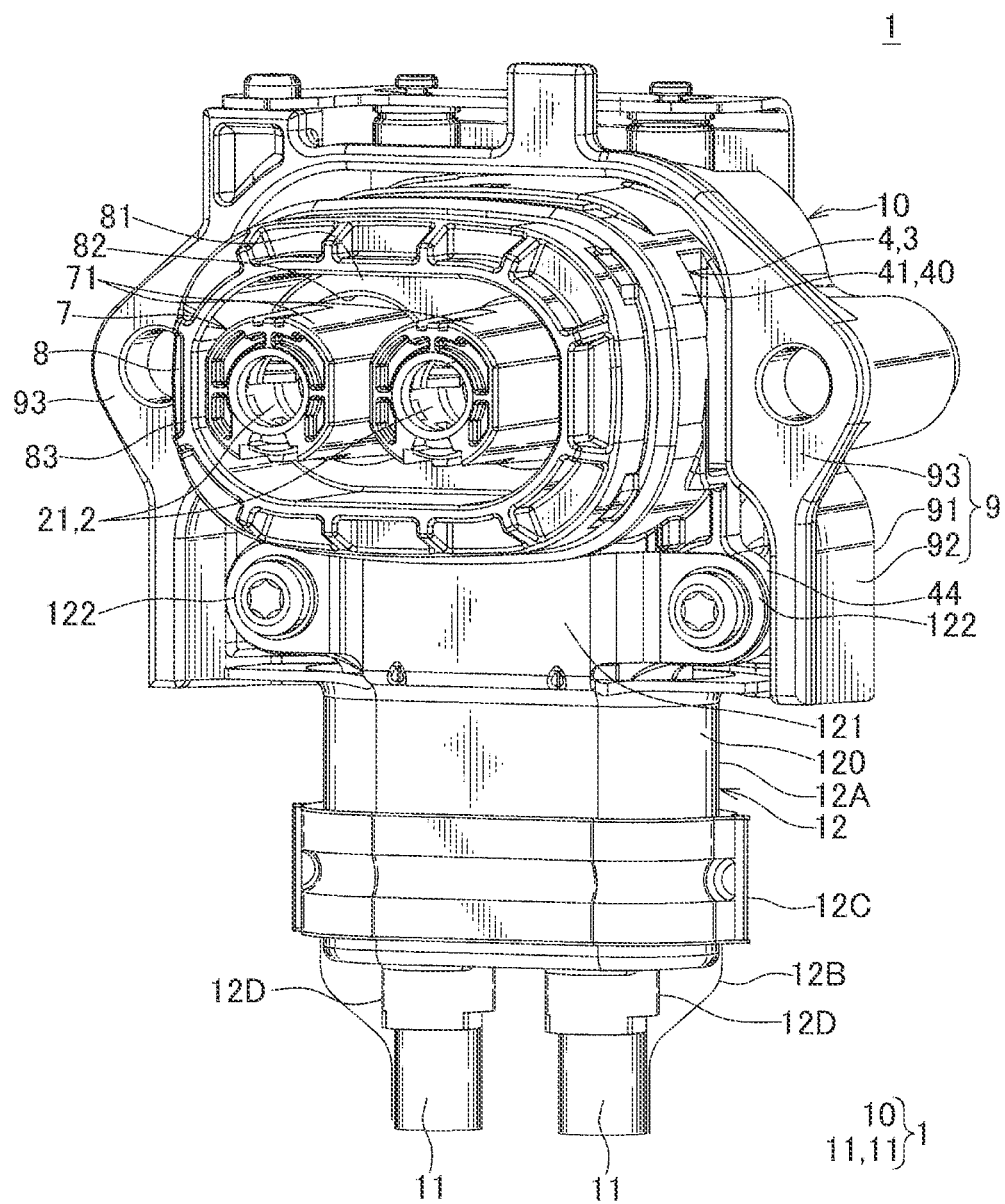
FIG. 1 is a perspective view illustrating a device connector according to one embodiment of the present invention.
Figure 2:
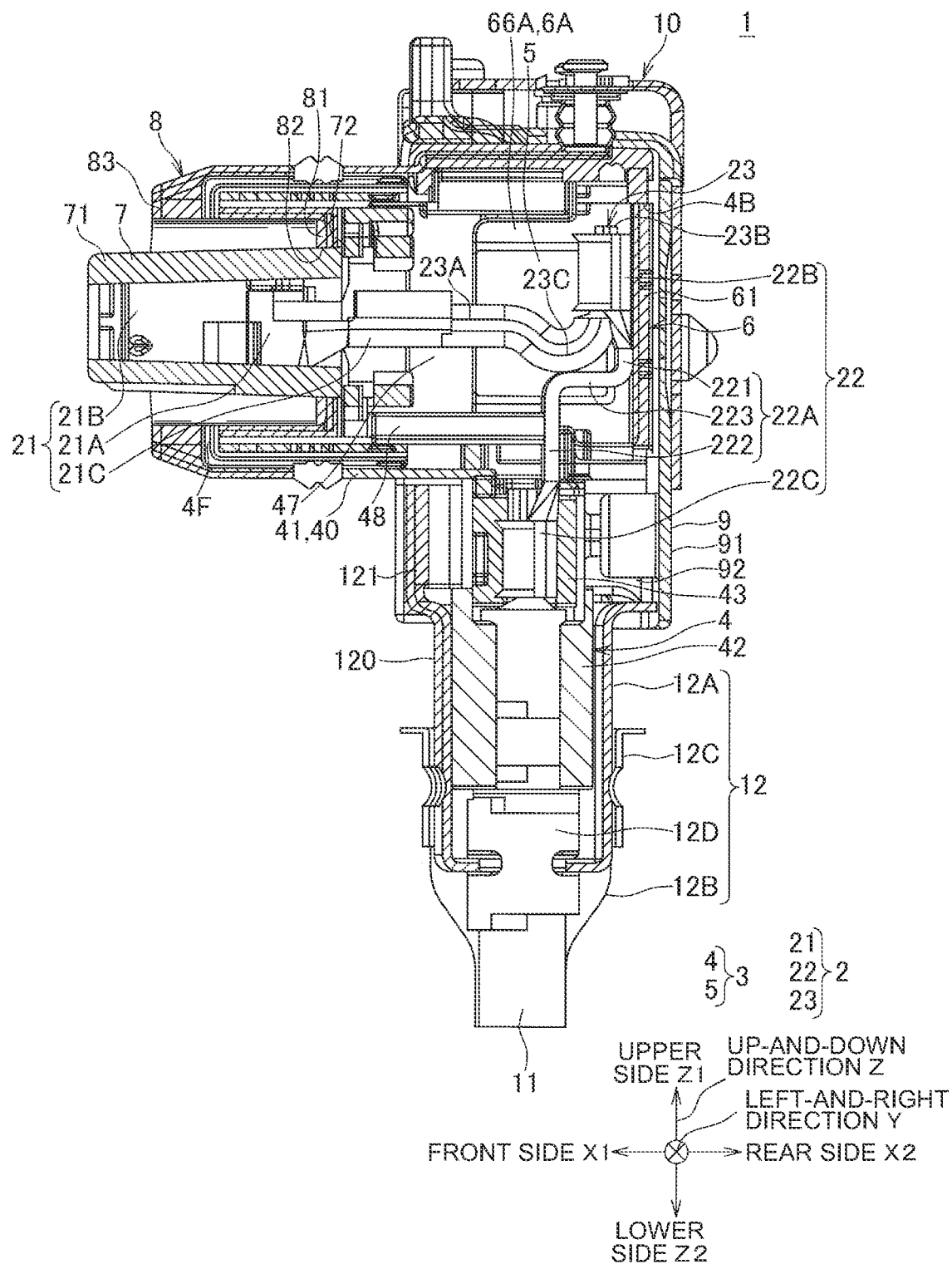
FIG. 2 is a longitudinal cross-sectional view illustrating the device connector.

Hereinafter, one embodiment of the present invention is explained with reference to FIGS. 1 to 7. FIG. 1 is a perspective view illustrating a device connector 10 according to one embodiment of the present invention. FIG. 2 is a longitudinal cross-sectional view illustrating the device connector 10. As illustrated in FIGS. 1 and 2, the device connector 10 according to the present embodiment constitutes an electric wire harness 1 provided in an automobile and the like, and is configured to be able to engage with a mating device, not illustrated.

As illustrated in FIGS. 1 and 2, the electric wire harness 1 includes: a device connector 10 in an L shape including a pair of terminal portions 2, 2; and a pair of electric wires 11, 11 connected to the pair of terminal portions 2, 2 and extending from the device connector 10.

Hereinafter, as illustrated in FIG. 2, an engaging direction in which the device connector 10 and the mating device engage with each other may be referred to as a "front-and-rear direction X", one of the directions perpendicular to the "front-and-rear direction X" may be referred to as a "left-and-right direction Y", and the other of the directions perpendicular to the "front-and-rear direction X" may be referred to as an "up-and-down direction Z". In the "front-and-rear direction X", a direction closer to the mating device with reference to the device connector 10 may be referred to as a "front side X1", and a direction opposite thereto may be referred to as a "rear side X2".

As illustrated in FIGS. 1 and 2, the device connector 10 includes: the pair of terminal portions 2, 2 configured to engage with the mating device; a housing body 3 made of synthetic resin for supporting the pair of terminal portions 2, 2; a shield body 12 configured to collectively cover the pair of electric wires 11, 11; and a conductive shell member 9 fastened to the case of the mating device (which may be hereinafter referred to as a mating case).

As illustrated in FIG. 2, the pair of terminal portions 2, 2 is arranged in the left-and-right direction Y. As illustrated in FIG. 2, each of the terminal portions 2 is configured in an L shape and includes: a device-side terminal 21 configured to engage with the mating device; an electric wire-side terminal 22 connected to the corresponding electric wire 11; and a connection conductor 23 composed of a braided conductor and configured to connect the device-side terminal 21 and the electric wire-side terminal 22.

As illustrated in FIG. 2, the device-side terminal 21 includes: a device-side terminal body 21A; a mating connection portion 21B in a tubular shape continuous to the front side X1 of the device-side terminal body 21A and configured to engage with the mating device; and a device-side conductor crimp portion 21C continuous to the rear side X2 of the device-side terminal body 21A and configured to be crimped and connected to a first extension portion 23A of the connection conductor 23. The mating connection portion 21B and the device-side conductor crimp portion 21C are coaxially provided to extend in the front-and-rear direction X. The device-side terminal 21 is configured such that the mating connection portion 21B is supported by a terminal support member 7 of a housing unit 4, explained later, such that the mating connection portion 21B is located on the front side X1 of the device-side conductor crimp portion 21C.

Even when an external force acts on the mating connection portion 21B via the mating device due to vibration of the vehicle and the like, an extra length portion 23C of the connection conductor 23 deforms to absorb the external force, so that the device-side terminal 21 maintains the engaged state with the mating device.

As illustrated in FIG. 2, the electric wire-side terminal 22 includes: an electric wire-side terminal body 22A; an electric wire-side conductor crimp portion 22B provided continuously to an upper end of the electric wire-side terminal body 22A and configured to be crimped and connected to a second extension portion 23B of the connection conductor 23; and an electric wire connection portion 22C provided continuously to a lower end of the electric wire-side terminal body 22A and configured to be crimped and connected to the corresponding electric wire 11. The electric wire-side terminal body 22A integrally includes: a first portion 221 extending to a lower side Z2 of the electric wire-side conductor crimp portion 22B; a second portion 222 extending to an upper side Z1 of the electric wire connection portion 22C; and a third portion 223 provided continuously to the first portion 221 and the second portion 222 and extending in the front-and-rear direction X. The electric wire-side terminal 22 is configured such that the electric wire connection portion 22C is located on the front side X1 with reference to the electric wire-side conductor crimp portion 22B. The electric wire-side terminal 22 is supported by being inserted into a terminal insertion portion 43 of a housing 40 explained later such that the electric wire-side conductor crimp portion 22B is on the upper side Z1 and on the rear side X2 with reference to the electric wire connection portion 22C.

As illustrated in FIG. 2, the connection conductor 23 includes: the first extension portion 23A extending in the front-and-rear direction X; the second extension portion 23B extending in the up-and-down direction Z; and the extra length portion 23C provided continuously to the first extension portion 23A and the second extension portion 23B and bending to the lower side Z2. One end (of the connection conductor 23) in the first extension portion 23A is crimped and connected to the device-side conductor crimp portion 21C of the device-side terminal 21 in such a state that the one end extends toward the mating device. The other end (of the connection conductor 23) in the second extension portion 23B is crimped and connected to the electric wire-side conductor crimp portion 22B of the electric wire-side terminal 22 in such a state that the other end extends toward the upper side Z1. The extra length portion 23C of the connection conductor 23 is located at a position in proximity to (at a position where the extra length portion 23C can come into contact with) an insulation wall 5 explained later.

As illustrated in FIG. 2, the housing body 3 includes: the housing unit 4 containing a pair of terminal portions 2, 2; and the insulation wall 5 located in the housing unit 4 to insulate the connection conductors 23 of the pair of terminal portions 2, 2 from each other.

In this case, the housing 40 (explained later), a rear cover 6 (cover), the terminal support member 7, and a front member 8 constituting housing unit 4 are composed of glass fiber-containing reinforced resin including glass fiber (resin including glass), and the insulation wall 5 is composed of talc-containing reinforced resin including talc (resin including talc). In other words, in the housing body 3, only the insulation wall 5 is composed of talc-containing reinforced resin.

In the present embodiment, talc-containing reinforced resin constituting the insulation wall 5 includes chemical name: polyphenylene sulfide at a content of 30-55%, chemical name: calcium carbonate at a content of 35-45%, chemical name: wollastonite (calcium silicate) at a content of 10-25%, and chemical name: crystalline silica at a content of less than 0.2%.

Glass included in the glass fiber-containing reinforced resin has a Mohs hardness of around 5.5, talc included in the talc-containing reinforced resin has a Mohs hardness of 1, and the talc-containing reinforced resin is less aggressive to metal than the glass fiber-containing reinforced resin. In the present embodiment, talc is used as a material with a low Mohs hardness. Furthermore, the talc-containing reinforced resin has a high surface smoothness, and its aggressiveness to metal is sufficiently suppressed.

Figure 3:
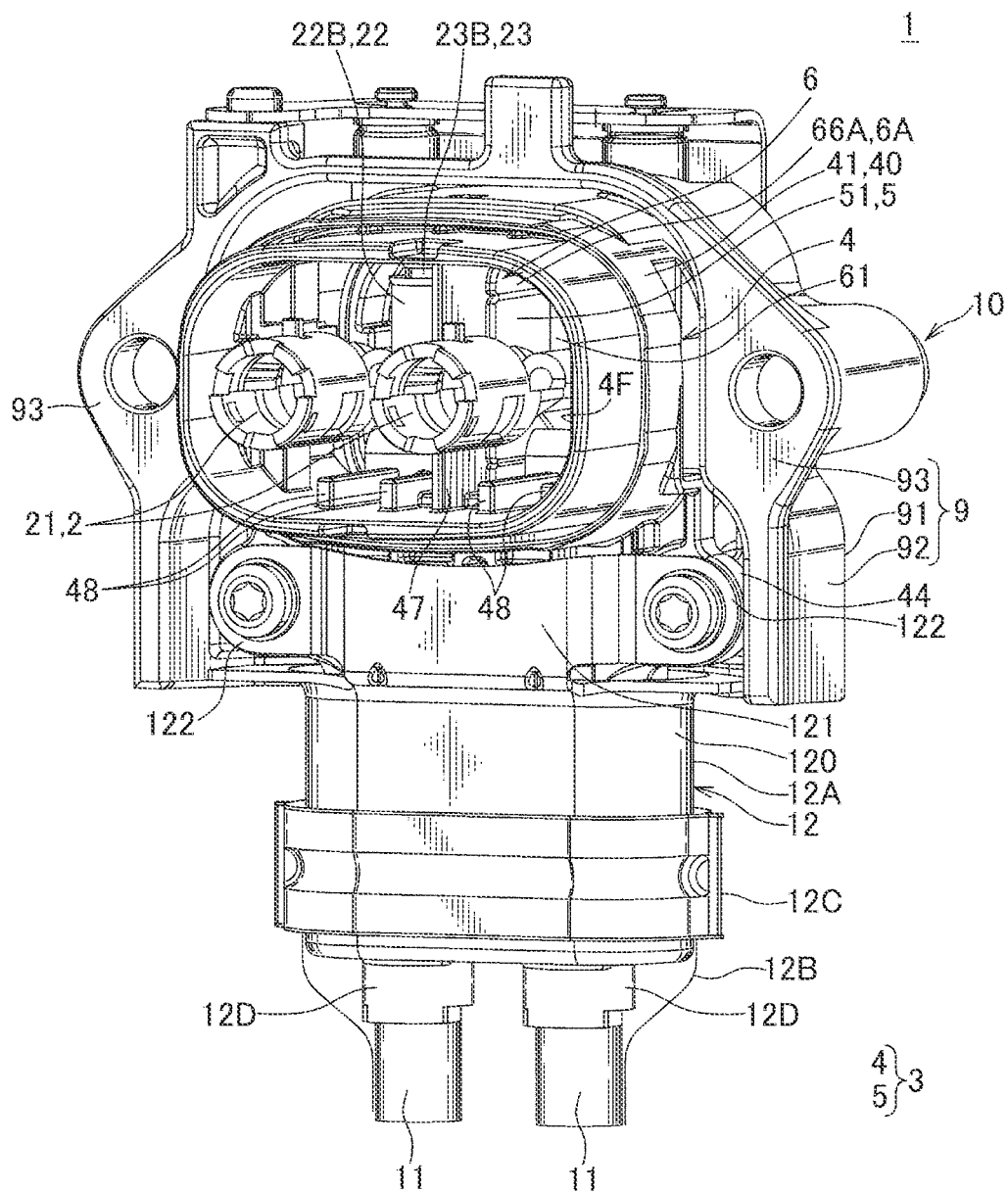
FIG. 3 is a perspective view illustrating an insulation wall constituting the device connector.

As illustrated in FIGS. 2 and 3, the housing unit 4 includes: the housing 40 in a tubular shape extending in the front-and-rear direction X; the rear cover 6 (cover) supported on the rear end of the housing 40; the terminal support member 7 (illustrated in FIG. 2) supporting the pair of terminal portions 2, 2 on the housing 40; and the front member 8 (illustrated in FIG. 2) supported on the front end of the housing 40. In FIG. 3, the terminal support member 7 and the front member 8 are omitted.

Figure 4:
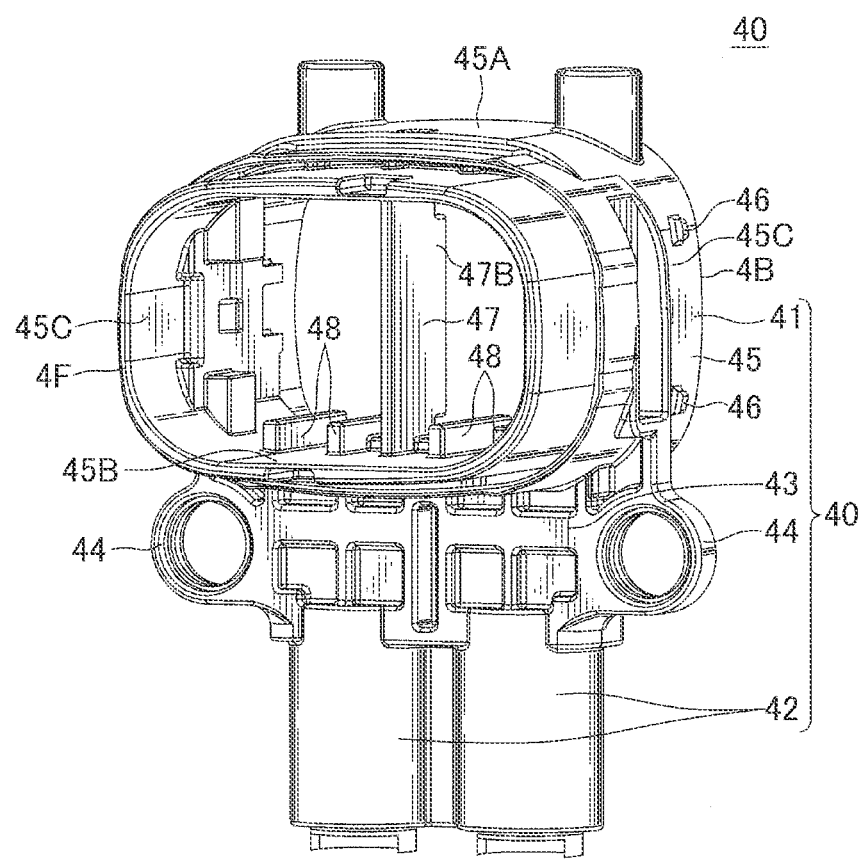
FIG. 4 is a perspective view illustrating a housing constituting the device connector.

As illustrated in FIG. 4, the housing 40 includes: a housing body 41 in a tubular shape extending in the front-and-rear direction X; a pair of electric wires insertion portions 42, 42 which is located on the lower side Z2 of the housing body 41 and in which a pair of electric wires 11, 11 is inserted; a terminal insertion portion 43 which is located between the pair of electric wires insertion portions 42, 42 and the housing body 41 and in which the electric wire-side terminals 22 are inserted; and housing-side fastening portions 44 provided on both sides, in the left-and-right direction Y, of the terminal insertion portion 43 and fastened to the shell members 9 explained later with bolts.

As illustrated in FIG. 4, the housing body 41 includes: a tubular shape portion 45 formed in an oval shape longer in the left-and-right direction Y and including a front side opening portion 4F that is open on the front side X1 and a rear side opening portion 4B (opening) that is open on the rear side X2; four latch-receiving portions 46 (only two are illustrated in FIG. 4) formed in a protruding manner on the outer surface of the tubular shape portion 45 and latched to latch portions 63 of the rear cover 6 explained later; a separation wall 47 (housing wall portion) separating in the left-and-right direction Y the interior of the tubular shape portion 45; and four (multiple) ribs 48.

As illustrated in FIG. 4, the tubular shape portion 45 includes: an upper wall 45A; a lower wall 45B facing the upper wall 45A; and a pair of side walls 45C, 45C provided continuously to the upper wall 45A and the lower wall 45B and facing each other in the left-and-right direction Y.

As illustrated in FIG. 4, the separation wall 47 is formed continuously to the upper wall 45A and the lower wall 45B of the tubular shape portion 45. This separation wall 47 is configured to have such a thickness that the separation wall 47 can be inserted between opposing plates 51, 51 of the insulation wall 5 explained later, and a rear end portion 47B of the separation wall 47 is configured to be inserted between the opposing plates 51, 51 of the insulation wall 5.

As illustrated in FIG. 4, the four (multiple) ribs 48 are formed in a protruding shape to protrude to the upper side Z1 from the lower wall 45B of the tubular shape portion 45 and extend in the front-and-rear direction X. The four ribs 48 are provided on both sides, in the left-and-right direction Y, of the separation wall 47, with two being on either side.

Figure 5:
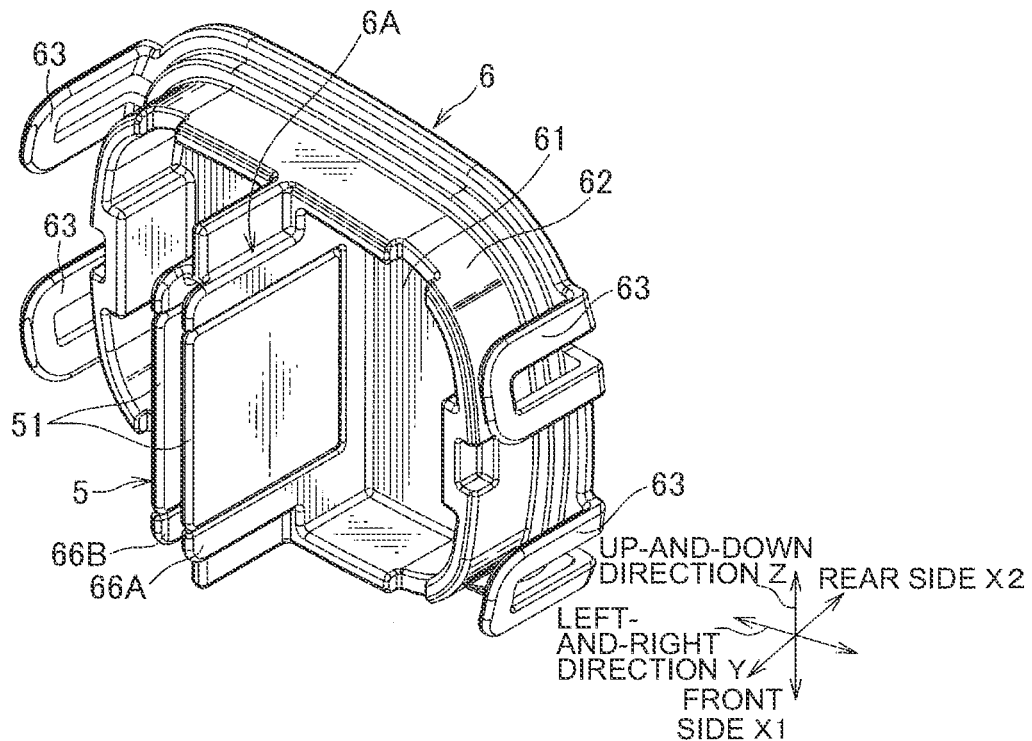
FIG. 5 is a perspective view illustrating a state in which an insulation wall is assembled with a rear cover (cover) constituting the device connector.
Figure 6:
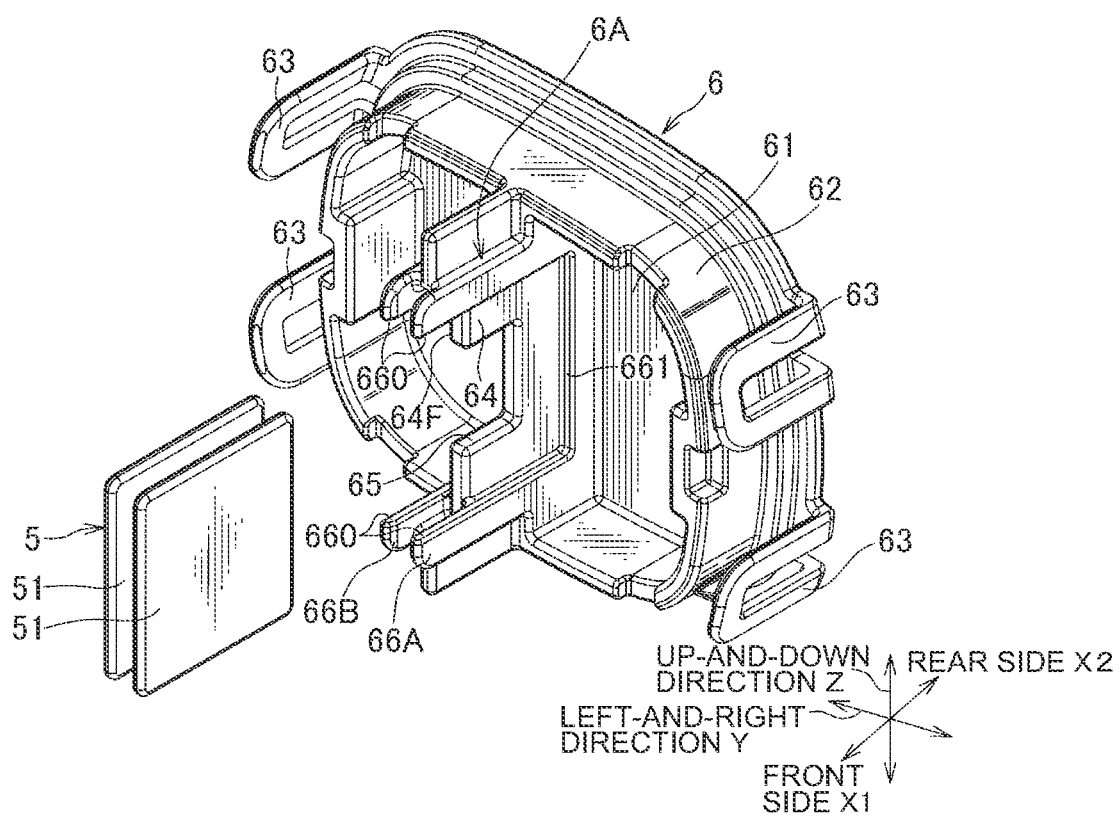
FIG. 6 is a perspective view illustrating how the insulation wall is assembled with the rear cover.

As illustrated in FIGS. 5, 6, the rear cover 6 includes: a rear cover body 61 (cover body) in a plate shape covering the rear side opening portion 4B of the housing body 41; an insertion portion 62 in a tubular shape protruding from the rear cover body 61 to the front side X1 and being inserted into the tubular shape portion 45; the four latch portions 63 for latching the latch-receiving portions 46 of the housing body 41; and a press-fit structure 6A into which the insulation wall 5 are press-fitted.

As illustrated in FIGS. 5, 6, the four latch portions 63 are provided spaced apart in the up-and-down direction Z at respective edges, in the left-and-right direction Y, of the rear cover body 61. The respective latch portions 63 are formed to extend toward the front side X1 from the respective edges, in the left-and-right direction Y, of the rear cover body 61, and formed in a U shape to be able to latch the respective latch-receiving portions 46 of the tubular shape portion 45.

As illustrated in FIG. 6, the press-fit structure 6A includes: a press-fit portion 64 (erected plate) in a plate shape provided to be erected from the rear cover body 61 to the front side X1 and press-fitted between the opposing plates 51, 51 of the insulation wall 5 explained later; a notch 65 which is formed in the press-fit portion 64 and in which a fixation portion 52 of the insulation wall 5 is inserted; and a pair of frame-shaped portions 66A, 66B provided on both sides, in the left-and-right direction Y, of the press-fit portion 64 to guide the opposing plates 51 of the insulation wall 5.

The press-fit portion 64 has a thickness slightly larger than the distance between the opposing plates 51, 51 of the insulation wall 5 explained later, and is configured to be press-fitted between the opposing plates 51, 51. As illustrated in FIG. 6, the front end 64F of the press-fit portion 64 is located on the rear side X2 with reference to the front end of the pair of frame-shaped portions 66A, 66B explained later.

In the central portion of the press-fit portion 64 in the up-and-down direction Z, the notch 65 is formed by cutting the front end 64F of the press-fit portion 64 in a rectangular shape. The notch 65 is formed such that the size thereof in the up-and-down direction is slightly larger than the size of the fixation portion 52 of the insulation wall 5 in the up-and-down direction Z, and the fixation portion 52 is configured to be inserted into the inside of the notch 65.

Each of the frame-shaped portions 66A, 66B is formed in a C shape, and includes: a pair of first end surfaces 660, 660 extending in the front-and-rear direction X and facing each other in the up-and-down direction Z; and a second end surface 661 provided continuously to the rear ends of the first end surfaces 660, 660 and extending in the up-and-down direction Z. The frame-shaped portions 66A, 66B are provided to be spaced apart from each other in the left-and-right direction Y, and the separation wall 47 of the housing 40 is configured to be inserted between the frame-shaped portions 66A, 66B. The pair of frame-shaped portions 66A, 66B is configured such that, when the insulation wall 5 is press-fitted into the press-fit structure 6A, the end surfaces the opposing plates 51, 51 of the insulation wall 5 come into proximity with the respective first end surfaces 660, 660, so that the pair of opposing plates 51, 51 is guided to the rear side X2.

As illustrated in FIG. 2, the terminal support member 7 includes: a pair of cylindrical portions 71, 71 into which the device-side terminals 21 of the terminal portions 2 are passed through; and a support plate portion 72 for supporting the rear ends of the cylindrical portions 71, 71. As illustrated in FIG. 2, with the device-side terminals 21 of the terminal portions 2 being inserted into the respective cylindrical portions 71, the front ends of the cylindrical portions 71 are located on the front side X1 with reference to the front ends of the device-side terminals 21. Specifically, with the device-side terminals 21 of the terminal portions 2 being inserted into the respective cylindrical portions 71, the device-side terminals 21 are located inside the respective cylindrical portions 71 and are not exposed to the outside.

As illustrated in FIG. 2, the front member 8 includes: a front plate-shaped portion 81 facing the front side X1 of the support plate portion 72 of the terminal support member 7; a pair of insertion holes 82, 82 (only one insertion hole 82 is illustrated in FIG. 2) which penetrates the front plate-shaped portion 81 and in which the pair of cylindrical portions 71, 71 of the terminal support member 7 is inserted; and a front tubular shape portion 83 formed in a tubular shape to be continuous to the outer peripheral edge of the front plate-shaped portion 81 and supported on the front end portion of the housing body 41.

As illustrated in FIG. 2, with the front member 8 being supported on the housing body 41, the cylindrical portions 71 of the terminal support members 7 are inserted into the respective insertion holes 82, 82 of the front plate-shaped portion 81 and provided to be exposed to the outside.

As illustrated in FIGS. 2 and 3, the shell member 9 includes: a shell wall portion 91 formed in a rectangular plate shape and facing the rear side X2 of the rear cover 6; a shell surrounding wall 92 erected from the peripheral edge of the shell wall portion 91 to extend to the front side X1; and a pair of shell-side fastening portions 93 (illustrated in FIG. 3) extending in the left-and-right direction Y from the front end of the shell surrounding wall 92 and fastened to the mating case, and is configured to be open on the front side X1 and the lower side Z2. The shell-side fastening portions 93 are configured to overlap the mating case to be fastened with the bolts.

The shell member 9 is provided with a pair of screw portions (not illustrated) protruding from the shell wall portion 91 to the front side X1. The screw portions are formed in a pillar shape erected to extend to the front side X1 and are configured to have female screws cut in the inside. The screw portions are provided on the rear side X2 of the housing-side fastening portions 44 of the housing 40 and shield-side fastening portions 122 of the shield body 12 explained later, and are configured such that, with the bolts being inserted into the housing-side fastening portions 44 and the shield-side fastening portions 122, the screw portions are fastened with the bolts.

Figure 7:
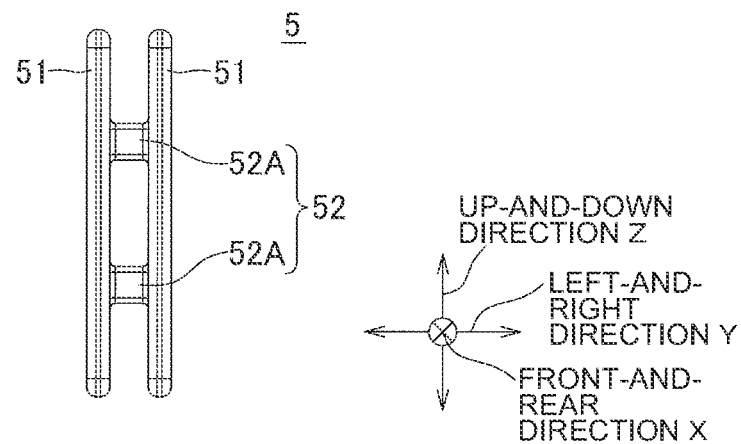
FIG. 7 is a view illustrating the insulation wall as seen from the front.

As illustrated in FIG. 7, the insulation wall 5 integrally includes: a pair of opposing plates 51, 51 formed in a rectangular plate shape and facing each other in the left-and-right direction Y; and a fixation portion 52 for fixing the opposing plates 51, 51 with each other.

A separation distance of the opposing plates 51, 51, i.e., the size of the fixation portion 52 in the left-and-right direction Y, is formed to be a size such that the rear end portion 47B of the separation wall 47 of the housing 40 can be inserted, and such that the press-fit portion 64 of the rear cover 6 can be inserted.

As illustrated in FIG. 7, the fixation portion 52 includes a pair of fixation members 52A, 52A. The fixation members 52A, 52A are spaced apart from each other in the up-and-down direction Z. The fixation member 52A is provided to extend in the front-and-rear direction X.

As illustrated in FIG. 1, the shield body 12 includes: a conductive shield member 12A; a braided conductor 12B in a tubular shape collectively covering the pair of electric wires 11, 11; a crimp ring 12C for crimping the upper end portion of the braided conductor 12B to fix the braided conductor 12B to the shield member 12A; and positioning members 12D attached to the respective electric wires 11, 11 to position the shield member 12A to predetermined positions of the respective electric wires 11.

As illustrated in FIG. 2, the shield member 12A includes: a shell body 120 in a tubular shape into which the pair of electric wires insertion portions 42, 42 provided on the housing 40 are inserted; an extension piece 121 that is continuous to the front end edge of the shell body 120 and extends to the upper side Z1; and the shield-side fastening portions 122 which are provided on both sides, in the left-and-right direction Y, of the extension piece 121 to overlap the housing-side fastening portions 44 and in which the bolts are inserted.

The shield body 12 is such that, with the shield member 12A being electrically connected to the braided conductor 12B of the electric wires 11, the shield member 12A is electrically connected via the shell member 9 to the mating case. This constitutes a shield circuit that shields electrical noise that leaks to the outside from the electric wires 11 that transmit control signals and the like, or electrical noise that comes in from the outside.

With the device connector 10, a procedure for assembling the insulation wall 5 and the rear cover 6 to the housing 40 will be described with reference to FIG. 6. First, the housing 40, the insulation wall 5, and the rear cover 6 are each formed by injection molding. The housing 40, the insulation wall 5, and the rear cover 6 are molded separately. The housing 40 and the rear cover 6 are molded using glass fiber-containing reinforced resin that includes glass fiber, and the insulation wall 5 is molded using talc-containing reinforced resin including talc.

Subsequently, when the insulation wall 5 is assembled with the rear cover 6, as illustrated in FIG. 6, the opposing plates 51, 51 of the insulation wall 5 are brought closer to the respective frame-shaped portions 66A, 66B of the rear cover 6, so that the end surfaces of the respective opposing plates 51, 51 come into proximity with the respective first end surfaces 660, and the press-fit portion 64 is press-fitted between the opposing plates 51, 51.

As the press-fit progresses, the fixation portion 52 of the insulation wall 5 is inserted to the inside of the notch 65, and the opposing plates 51, 51 are positioned inside the frame-shaped portions 66A, 66B, respectively. In this way, the insulation wall 5 is assembled (supported) on the rear cover 6.

With the device-side terminal 21, the electric wire-side terminal 22, and the connection conductor 23 being connected with each other and housed at predetermined positions, as illustrated in FIG. 6, the insulation wall 5 assembled with the rear cover 6 is brought closer to the separation wall 47 of the housing 40 in such an orientation that the rear cover body 61 of the rear cover 6 faces the rear side opening portion 4B of the housing 40. The rear end portion 47B of the separation wall 47 is inserted between the opposing plates 51, 51 of the insulation wall 5 and between the frame-shaped portions 66A, 66B. In this manner, the insulation wall 5 is supported on the housing 40.

At approximately the same time, the latch portions 63 of the rear cover 6 latch the corresponding latch-receiving portions 46 of the housing 40. Thus, the assembly of the insulation wall 5 and the rear cover 6 to the housing 40 is completed. In an assembled state in which the assembly of the insulation wall 5 and the rear cover 6 to the housing 40 is completed, the insulation wall 5 is supported by both of the rear cover 6 and the housing 40. In the assembled state, the extra length portions 23C of the connection conductors 23 are provided, on both sides of the insulation wall 5 in the left-and-right direction Y, at positions in proximity to (at positions where the extra length portions 23C can come into contact with) the insulation wall 5.

According to the above-described embodiment, the insulation wall 5 is configured to include talc that is a material with a lower Mohs hardness than the housing unit 4. In other words, since the insulation wall 5 is configured to include talc, the insulation wall 5 is less aggressive to metal. Therefore, generation of wear particles can be alleviated when the connection conductor 23 slides on the insulation wall 5 due to vibration of the automobile or the like. Furthermore, since the insulation wall 5 is configured to include talc, the connection conductor 23 and the insulation wall 5 can be brought into proximity to each other, so that increase in size of the device connector 10 in the direction in which the terminal portions 2, 2 are arranged (left-and-right direction Y) can be alleviated.

Further, the housing unit 4 is composed of glass fiber-containing reinforced resin (resin including glass), and the insulation wall 5 is composed of talc-containing reinforced resin (resin including talc). Specifically, the resin including talc has a high surface smoothness, and generation of wear particles can be furthermore alleviated. Talc that is high in cost is used only for the insulation wall 5, so that the increase in the cost of materials can be alleviated.

Furthermore, the housing unit 4 includes: the housing 40 that is formed in a tubular shape an axis of which is in the front-and-rear direction X (engaging direction) with respect to the mating device and that includes a rear side opening portion 4B (opening) on the rear side X2 (a side away from the mating device); and the rear cover 6 (cove) supported on the housing 40 and covering the rear side opening portion 4B, and the insulation wall 5 is provided separately from the housing 40 and the rear cover 6 is supported on the rear cover 6. According to this configuration, while good assembly workability is ensured, generation of wear particles can be alleviated when the connection conductor 23 slides on the insulation wall 5.

Furthermore, the insulation wall 5 is provided separately from the housing 40 and the rear cover 6, and is supported on the housing 40. When the insulation wall 5 is supported by both the housing 40 and the rear cover 6, the insulation wall 5 is sandwiched and supported in the front-and-rear direction X by both. According to this configuration, the insulation wall 5 is supported by both in a stable state.

Furthermore, the insulation wall 5 includes the pair of opposing plates 51, 51 and the fixation portion 52 provided between the opposing plates 51, 51 and fixing the opposing plates 51, 51, and the rear cover 6 (cover) includes the rear cover body 61 (cover body) in a plate shape covering the rear side opening portion 4B (opening) and the press-fit portion 64 (erected plate) protruding in a plate shape from the rear cover body 61 toward the mating device, and the insulation wall 5 is configured such that the press-fit portion 64 is press-fitted between the opposing plates 51, 51. According to this configuration, the insulation wall 5 can be assembled with the rear cover 6 with good workability while rattling is alleviated.

The press-fit portion 64 (erected plate) includes the notch 65 which is formed by cutting the edge on the side of the mating device and in which the fixation portion 52 is inserted while the press-fit portion 64 is press-fitted between the opposing plates 51, 51. According to this configuration, even when vibration of the automobile or the like occurs, displacement in position of the insulation wall 5 with respect to the rear cover 6 can be alleviated.

Furthermore, the insulation wall 5 includes the pair of opposing plates 51, 51 and the fixation portion 52 provided between the opposing plates 51, 51 and fixing the opposing plates 51, 51, and the housing 40 includes the housing body 41 formed in a tubular shape and the separation wall 47 (housing wall portion) that partitions the interior of the housing body 41 to insulate the terminal portions 2, 2 from each other, and the insulation wall 5 is configures such that the separation wall 47 is inserted between the opposing plates 51, 51. According to this configuration, displacement in position of the insulation wall 5 in the front-and-rear direction X can be furthermore alleviated.

It should be noted that the present invention is not limited to the embodiment, and includes other configurations and the like that can achieve the object of the present invention, and the following modifications and the like are also included in the present invention.

In the embodiment, the rear cover 6 includes a press-fit structure 6A into which the insulation wall 5 is press-fitted, and the insulation wall 5 is fixed to the press-fit structure 6A of the rear cover 6 by press-fit, but the present invention is not limited thereto. The insulation wall 5 may be fixed to the rear cover 6 using an adhesive agent. In this case, in addition to the press-fit structure 6A, the insulation wall 5 may be fixed by adhesion, or another fixation structure separate from the press-fit structure 6A may be provided, and the insulation wall 5 may be fixed to the rear cover 6 by adhesion.

Furthermore, in the embodiment, the insulation wall 5 is supported by both the housing 40 and the rear cover 6, but the present invention is not limited thereto. The insulation wall may be supported only on the rear cover 6, or may be supported only on the housing 40.

Figure 8:
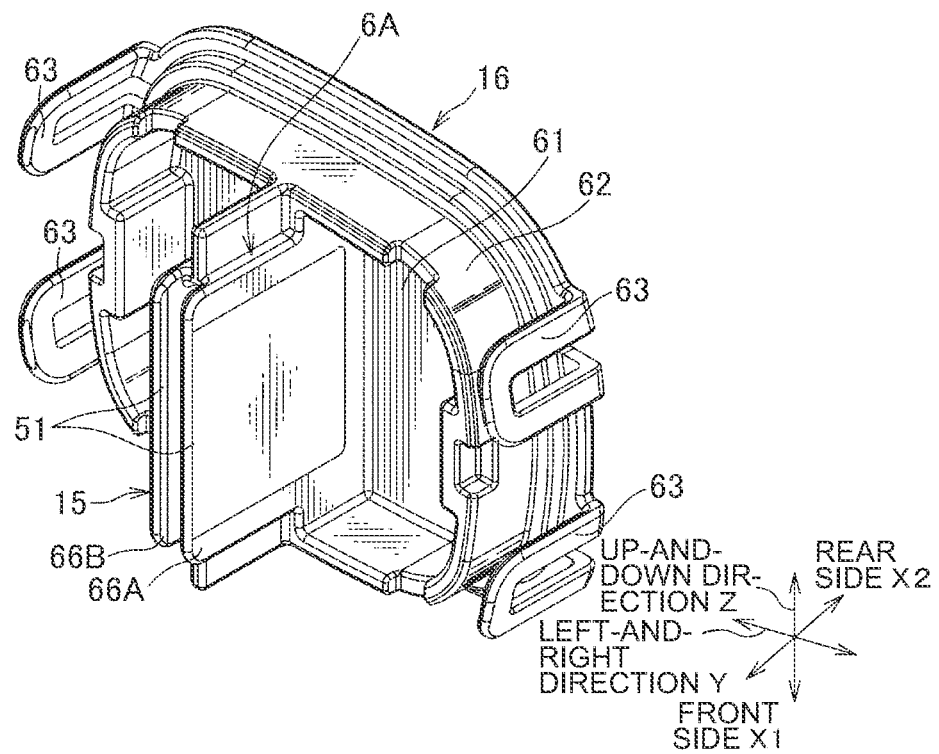
FIG. 8 is a perspective view illustrating a modification of the device connector.

Furthermore, in the embodiment, the insulation wall 5 is constructed separately from the housing 40 and the rear cover 6, but the present invention is not limited thereto. As illustrated in FIG. 8, an insulation wall 15 is formed on the rear cover by secondary molding, and the rear cover 16 on which the insulation wall 15 is integrally molded may be constructed. Specifically, the method for producing the device connector may include a primary molding process for molding the rear cover 6 (cover), and a secondary molding process for integrally molding the insulation wall 15 and the rear cover 6.

Alternatively, the insulation wall is formed on the housing 40 by secondary molding, and the insulation wall 5 and the housing 40 may be formed integrally. Specifically, the method for producing the device connector may include a primary molding process for molding the housing 40, and a secondary molding process for integrally molding the insulation wall and the housing 40.

Furthermore, in the embodiment, the device connector 10 includes the pair of terminal portions 2, 2, the housing body 3 including the housing unit 4 and the insulation wall 5, the shield body 12 for collectively covering the pair of electric wires 11, 11, and the conductive shell member 9, but the present invention is not limited thereto. The device connector includes the pair of terminal portions 2, 2 and the housing body 3 including the housing unit 4 and the insulation wall 5. The shield body 12 and the shell member 9 may be omitted, and the insulation wall may be configured to include a material with a lower Mohs hardness than the housing unit.

Although the best configuration, method, and the like for carrying out the present invention are disclosed in the above description, the present invention is not limited thereto. That is, although the present invention has been particularly illustrated and described primarily with respect to the particular embodiment, it is understood that, without departing from the spirit and scope of the present invention, the present invention can be modified in various ways by those skilled in the art in terms of shape, material, quantity, and other detailed configurations of the embodiment described above. Therefore, since the descriptions that limit the shape, material, and the like disclosed above are illustrative examples to facilitate understanding of the present invention, and do not limit the present invention, a description with a name of a member, from which some or all of the limitations on the shape, material, and the like are deleted, is to be included in the present invention.

LIST OF REFERENCE SIGNS 10 device connector
2, 2 pair of terminal portions
21 device-side terminal
22 electric wire-side terminal
23 connection conductor
23C extra length portion
3 housing body
4 housing unit
40 housing
41 housing body
47 separation wall (housing wall portion)
4B rear side opening portion (opening)
5 insulation wall
51, 51 pair of opposing plates
52 fixation portion
6 rear cover (cover)
61 rear cover body (cover body)
64 press-fit portion (erected plate)
65 notch
X front-and-rear direction (engaging direction)

What is claimed is:

1. A device connector for engaging with a mating device, comprising:
   a pair of terminal portions facing the mating device; and
   a housing body made of synthetic resin containing the pair of terminal portions,
   wherein each of the terminal portions includes:
      a device-side terminal configured to engage with the mating device;
      an electric wire-side terminal connected to an electric wire; and
      a connection conductor having a flexibility and configured to connect the device-side terminal and the electric wire-side terminal,
   wherein the connection conductor is formed to have an extra length portion and extend toward the device-side terminal,
   the housing body includes: a housing unit containing the pair of terminal portions; and an insulation wall located in the housing unit to insulate the connection conductor of one of the terminal portions from the connection conductor of the other of the terminal portions, and
   the insulation wall is configured to include a material with a lower Mohs hardness than the housing unit.

2. The device connector according to claim 1,
   wherein the housing unit is composed of resin including glass,
   the insulation wall is composed of resin including talc.

3. The device connector according to claim 1,
   wherein the housing unit includes:
      a housing formed in a tubular shape an axis of which is in an engaging direction with respect to the mating device, the housing including an opening on a side away from the mating device; and
      a cover supported on the housing to cover the opening,
   wherein the insulation wall is provided separately from the housing and the cover, and supported on the cover.

4. The device connector according to claim 1,
   wherein the housing unit includes:
      a housing formed in a tubular shape an axis of which is in an engaging direction with respect to the mating device, the housing including an opening on a side away from the mating device; and
      a cover supported on the housing to cover the opening,
   wherein the insulation wall is provided separately from the housing and the cover, and supported on the housing.

5. The device connector according to claim 1,
   wherein the housing unit includes:
      a housing formed in a tubular shape an axis of which is in an engaging direction with respect to the mating device, the housing including an opening on a side away from the mating device; and
      a cover supported on the housing to cover the opening,
   wherein the insulation wall is provided separately from the housing and the cover, and supported on both the cover and the housing.

6. The device connector according to claim 3,
   wherein the insulation wall includes: a pair of opposing plates; and a fixation portion provided between the opposing plates to fix the opposing plates,
   the cover includes: a cover body in a plate shape covering the opening; and an erected plate protruding in a plate shape from the cover body to the mating device, and
   the insulation wall is configured such that the erected plate is press-fitted between the opposing plates constituting the pair.

7. The device connector according to claim 6,
   wherein the erected plate includes a notch formed by cutting an edge of the erected plate on a side of the mating device, and
   the fixation portion is inserted into the notch while the erected plate is press-fitted between the opposing plates constituting the pair.

8. The device connector according to claim 4,
   wherein the insulation wall includes a pair of opposing plates and a fixation portion provided between the opposing plates to fix the opposing plates,
   the housing includes a housing body formed in a tubular shape and a housing wall portion partitioning an interior of the housing body to insulate between the terminal portions constituting the pair, and
   the insulation wall is configured such that the housing wall portion is inserted between the opposing plates.

9. The device connector according to claim 5,
   wherein the insulation wall includes a pair of opposing plates and a fixation portion provided between the opposing plates to fix the opposing plates,
   the housing includes a housing body formed in a tubular shape and a housing wall portion partitioning an interior of the housing body to insulate between the terminal portions constituting the pair, and
   the insulation wall is configured such that the housing wall portion is inserted between the opposing plates.

* * * * *